United States Patent [19]
Suzuki et al.

[11] Patent Number: 5,764,817
[45] Date of Patent: Jun. 9, 1998

[54] IMAGE PROCESSING APPARATUS FOR EFFECTING A SERIES OF PROCESSES

[75] Inventors: Noriyuki Suzuki, Neyagawa; Noriko Tokuda, Osaka; Yoshihiro Itsuzaki, Kashihara; Akira Kobayashi, Osaka; Kinji Horikami, Suita; Hideo Kano; Kouji Yoshii, both of Katano, all of Japan

[73] Assignee: Matsushita Electric Industrial Co., Ltd., Osaka-fu, Japan

[21] Appl. No.: 374,086

[22] Filed: Jan. 18, 1995

[30] Foreign Application Priority Data

Jan. 19, 1994 [JP] Japan .................. 6-003947

[51] Int. Cl.$^6$ ........................................... G06K 9/00
[52] U.S. Cl. ................................. 382/302; 382/101
[58] Field of Search .......................... 382/302, 303, 382/304, 141, 151, 101, 102, 103, 105, 108, 109, 111, 112, 113, 114, 135, 136, 138, 165, 181, 190, 286, 305, 306, 307, 308, 312, 317, 321, 154; 364/160, 180, 172, 920.7, 920.8; 348/42; 356/12

[56] References Cited

U.S. PATENT DOCUMENTS 4,322,716  3/1982  Sternberg .................. 340/146.3
4,574,394  3/1986  Holsztynski et al. ......... 382/276
5,144,684  9/1992  Inada et al. ................. 382/199
5,309,522  5/1994  Dye .......................... 382/276
5,452,375  9/1995  Rousseau et al. ............. 382/302

Primary Examiner—Leo Boudreau
Assistant Examiner—Bijan Tadayon
Attorney, Agent, or Firm—Wenderoth, Lind & Ponack

[57] ABSTRACT

An image processing apparatus for effecting a series of processes for capturing an image and scrutinizing the captured image is disclosed. Each process in series of processes is selected from different modes of processes. Selector selects a mode of process for each of the series of processes. A preselected number of parameters are set for each of the selected mode of processes, and the set parameters are stored in a parameter memory sequentially. Mode data indicative of the selected modes for the series of processes are stored in the mode memory. A parameter number table informs the number of parameters necessary for each mode in each of the series of processes. When the parameters and the mode data are read from the parameter memory and said mode memory, respectively, parameter allocator allocates and produces proper parameters to corresponding modes of processes with reference to the parameter number table.

9 Claims, 14 Drawing Sheets

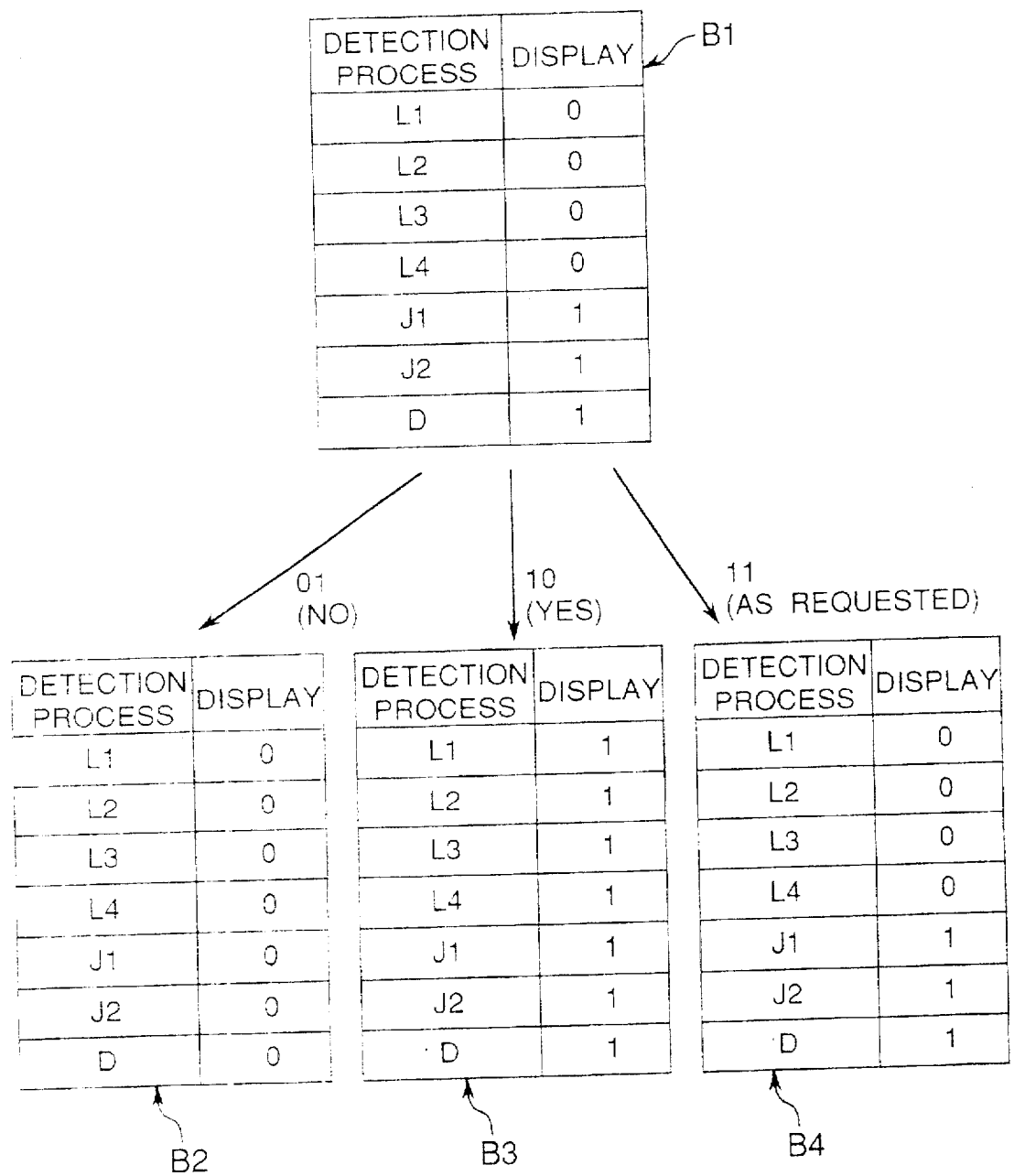

Fig.6B

| EXE SEQ | ID (SYS DATA) | PROCESS |
|---|---|---|
| 1 | — | IMAGE |
| 2 | 1 | EDGE |
| 3 | 1 | LINE |
| 4 | 2 | CIRCLE |

Fig.6C

| EXE SEQ | ID (SYS DATA) |
|---|---|
| 2 | 1 |
| 3 | 1 |
| 4 | 2 |

Fig.6D

| EXE SEQ | CONDITION |
|---|---|
| 1 | USED |
| 2 | USED |
| 3 | NOT USED |

Fig.6E

| EXE SEQ | ID (SYS DATA) | PROCESS |
|---|---|---|
| 1 | — | IMAGE |
| 2 | 1 | EDGE |
| 3 | 2 | CIRCLE |

Fig.6F

| EXE SEQ | ID (SYS DATA) |
|---|---|
| 2 | 1 |
| 3 | 2 |

Fig.6G

| EXE SEQ | CONDITION |
|---|---|
| 1 | USED |
| 2 | USED |
| 3 | NOT USED |

Fig.6H

| EXE SEQ | ID (SYS DATA) | PROCESS |
|---|---|---|
| 1 | — | IMAGE |
| 2 | 2 | CIRCLE |

Fig.6I

| EXE SEQ | ID (SYS DATA) |
|---|---|
| 2 | 2 |

Fig.6J

| EXE SEQ | CONDITION |
|---|---|
| 1 | NOT USED |
| 2 | USED |
| 3 | NOT USED |

Fig.6K

| EXE SEQ | ID (SYS DATA) | PROCESS |
|---|---|---|
| 1 | — | IMAGE |
| 2 | 2 | CIRCLE |
| 3 | 1 | CIRCLE |

Fig.6L

| EXE SEQ | ID (SYS DATA) |
|---|---|
| 2 | 2 |
| 3 | 1 |

Fig.6M

| EXE SEQ | CONDITION |
|---|---|
| 1 | USED |
| 2 | USED |
| 3 | NOT USED |

IMAGE PROCESSING APPARATUS FOR EFFECTING A SERIES OF PROCESSES

BACKGROUND OF THE INVENTION

1. Field of the invention

The present invention relates to an image processing apparatus used in manufacturing and assembly facilities.

2. Description of the prior art

Image processing apparatuses used in manufacturing facilities for sequential execution of complete processes have been previously developed, but are primarily used today for testing and evaluation. FIG. 9 is a block diagram of a conventional sequential process execution type image processing apparatus comprising a measured value memory 32 for storing process execution results; a process performer 33; a process interpreter and process executor 34 for interpreting and executing the steps of each process; a process execution sequence memory 35 for storing the sequence in which the process is executed; a process execution sequence editor 36 for editing the information stored by the process execution sequence memory 35; a process parameter memory 37 for storing the parameters defining the process execution state; a process parameter type memory 38 storing the parameter type information used for parameter interpretation; and a process parameter editor 39 for editing the parameters stored by the process parameter memory 37.

Using the image processing apparatus shown in FIG. 9, the operator teaches the parameters of the process using the process parameter editor 39, and teaches the execution sequence of the process using the process execution sequence editor 36, to the process performer 33. The taught execution sequence is stored to the process execution sequence memory 35, and the process parameters used by the process performer 33 are stored to the process parameter memory 37. When teaching is completed and the process interpreter and process executor 34 is set to the on-line run state, the process interpreter and process executor 34 reads the process type of the process execution sequence from the process execution sequence memory 35, reads the parameters applied to the corresponding process from the process parameter memory 37 based on the format stored to the process parameter type memory 38; and automatically executes image processing by applying the required parameters and sequentially running each process of the process performer 33. The process performer 33 can read the results output by the measured value memory 32 as input data during process execution.

As noted above, however, this conventional sequential process execution type image processing apparatus is only practical for experimental and evaluation purposes, and there are essentially no apparatuses that can be used for practical positioning or inspection purposes in normal factory applications by simply inputting the sequence of the process. FIG. 10 is a process diagram showing the processes required to detect the edges of a target object. Each box in FIG. 10 represents one process. What FIG. 10 attempts to illustrate is that, in order to achieve the objectives for which image processing apparatuses can be used in factories (including positioning and inspection), each individual process unit (what is accomplished or determined by each process) is very small, and a large number of small process units must be combined to accomplish a given task.

This need to assemble a large number of processes means that an extremely large number of settings must be made to achieve any single objective, rendering the image processing apparatus substantially unusable for commercial applications. To detect the edges of an object in a factory as in the above example, plural points must be measured, the distance between these points determined, and the shape of the target object determined to be good/bad (pass/fail) based on the combination of measured points and distances; this process is even more complex than that shown in FIG. 10.

Why the processing unit of such conventional image processing operations is small is a function of the many different methods that must be used to achieve specific image processing objectives, and the need to select and deploy the appropriate method based on such conditions as the shape of the subject, contrast, the required precision, and processing speed. As shown in FIG. 10, even the single objective of edge detection requires the combination of plural processes, and creating a general process for edge detection requires an extremely large number of parameters defining the component methods of the process.

Making the process unit larger with a conventional image processing apparatus makes it substantially impossible to manage the extremely large number of parameters required, and parameter management problems thus limit the maximum size of the process unit. Furthermore, when the process unit is small as shown in FIG. 10, the types of data passed between individual processes increase in number and become unmanageable, further inhibiting the commercial deployment of image processing apparatuses.

SUMMARY OF THE INVENTION

Therefore, an object of the present invention is to provide an image processing apparatus whereby parameters can be efficiently stored even when the number of parameters applied to the processes becomes large.

A further object of the present invention is to provide a user-friendly image processing apparatus whereby the number of parameter settings applied to the processes is reduced.

A further object of the present invention is to provide a user-friendly image processing apparatus whereby both a detailed display setting and a simplified display setting can be selected for displaying process contents.

A further object of the present invention is to provide a user-friendly image processing apparatus whereby the position of the processing area can be easily corrected.

A further object of the present invention is to provide a user-friendly image processing apparatus whereby parameters common to the entire process can be batch displayed or set, and major process parameters can be shared between processes.

A further object of the present invention is to provide a user-friendly image processing apparatus whereby access control can be easily achieved when plural processes use the same parameter common to those processes.

To achieve the aforementioned objects, an image processing apparatus according to the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means.

An image processing apparatus according to a second embodiment of the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means; and is characterized by the measured value memory means comprising a position memory means and a pass/fail memory means; the editing means being able to specify for said position memory means and pass/fail memory means the name or number of the data of the units required for the process; and the process performing means being able to access the measured value memory means by name or number for process input/output.

An image processing apparatus according to a third embodiment of the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a content display on/off setting means for individual process execution; a content display on/off setting means for the complete sequence of executed processes; and is characterized by the process performing means being able to display or not display the process contents based on a display on/off signal.

An image processing apparatus according to a fourth embodiment of the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means common to all processes for editing and storing the shape and compensation data of the processed area; and a means common to all processes for reading position data from the measured value memory means to set the position of the processed area.

An image processing apparatus according to a fifth embodiment of the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; and a means for accessing by a unique name or number any separately-stored data required for the process as parameters to be applied to the process.

An image processing apparatus according to a sixth embodiment of the present invention comprises: a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; a means for accessing by a unique name or number any separately-stored data required for the process as parameters to be applied to the process; a means for storing the process execution sequence and the number or name specifying data stored separately to the means for storing the parameters applied to each process; and a means for managing the data stored separately to the means for storing the parameters applied to each process by the process execution sequence and data number/name information memory means.

[Operation]

An image processing apparatus according to the first embodiment of the invention can efficiently store parameters even when the number of parameters applied to the processes becomes large because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means.

An image processing apparatus according to the second embodiment of the invention is user-friendly and reduces the number of parameter settings applied to the processes because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means; and is characterized by the measured value memory means comprising a position memory means and a pass/fail memory means; the editing means being able to specify for said position memory means and pass/fail memory means the name or number of the data of the units required for the process; and the process performing means being able to access the measured value memory means by name or number for process input/output.

An image processing apparatus according to the third embodiment of the invention is user-friendly and can select either a detailed display setting or a simplified display setting for displaying process contents because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a content display on/off setting means for individual process execution; a content display on/off setting means for the complete sequence of executed processes; and is characterized by the process performing means being able to display or not display the process contents based on a display on/off signal.

An image processing apparatus according to the fourth embodiment of the invention is user-friendly and can easily correct the position of the processing area because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means common to all processes for editing and storing the shape and compensation data of the processed area; and a means common to all processes for reading position data from the measured value memory means to set the position of the processed area.

An image processing apparatus according to the fifth embodiment of the invention is user-friendly, can batch display and batch set parameters common to the entire process, and can share major process parameters between processes because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; and a means for accessing by a unique name or number any separately-stored data required for the process as parameters to be applied to the process.

An image processing apparatus according to the sixth embodiment of the invention is user-friendly, and can easily control access when plural processes use the same parameter common to those processes because it comprises a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; a means for accessing by a unique name or number any separately-stored data required for the process as parameters to be applied to the process; a means for storing the process execution sequence and the number or name specifying data stored separately from the means for storing the parameters applied to each process; and a means for managing the data stored separately to the means for storing the parameters applied to each process by the process execution sequence and data number/name information memory means.

BRIEF DESCRIPTION OF THE DRAWINGS

The present invention will become more fully understood from the detailed description given below and the accompanying diagrams wherein:

FIG. 3B shows tables indicating display and non-display modes for various detection processes;

FIGS. 6B, 6C, 6D, 6E, 6F, 6G, 6H, 6I, 6J, 6K, 6L and 6M are diagrams showing tables;

DESCRIPTION OF PREFERRED EMBODIMENTS

First Embodiment

Figure 1A:
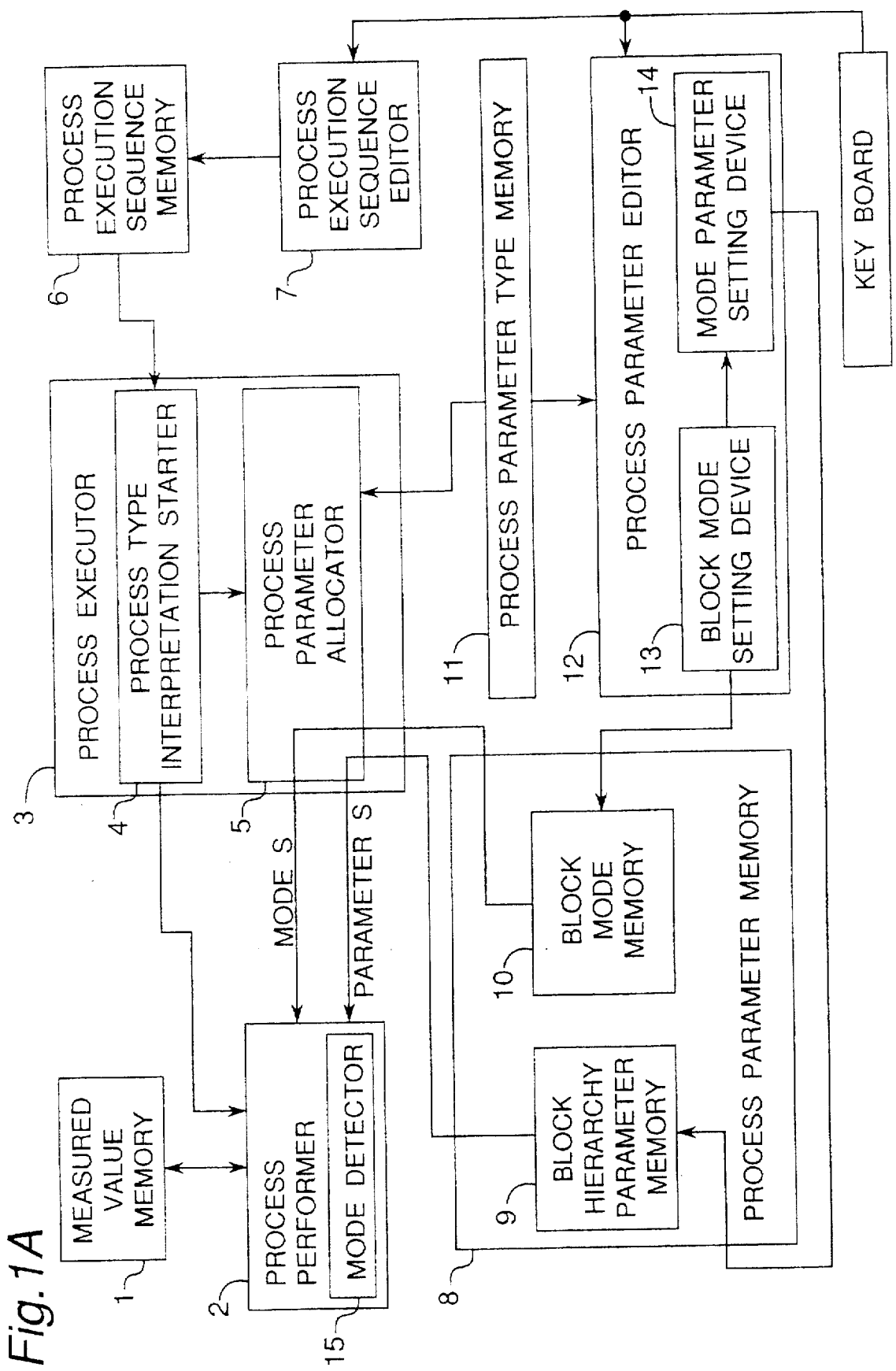
FIG. 1A is a block diagram of an image processing apparatus according to a first embodiment of the present invention.

Referring to FIG. 1A an image processing apparatus according to the first embodiment of the invention is shown. A measured value memory 1 stores the result of each process output by a process performer 2. The process performer 2 includes various machines, such as a camera for viewing an object, a conveyor for sending an object, etc, which are not shown. A process executor 3 is a computer program executor which interprets and then executes each process. The process executor 3 comprises a process type interpretation starter 4 for starting a selected program, and a process parameter allocater 5 for applying particular process parameters to the selected program. The process type interpretation starter 4 controls interpretation of the type of process to be executed, and the process parameter allocator 5 applies particular parameters to the process performer 2.

A process execution sequence memory 6 stores the execution sequence, i.e., the program, of various processes that can be executed by the process executor 3. A process execution sequence editor 7 is operated by a key board and selects and edits the sequence information, i.e., the programs, stored in the process execution sequence memory 6.

Figures 1B, 1C:
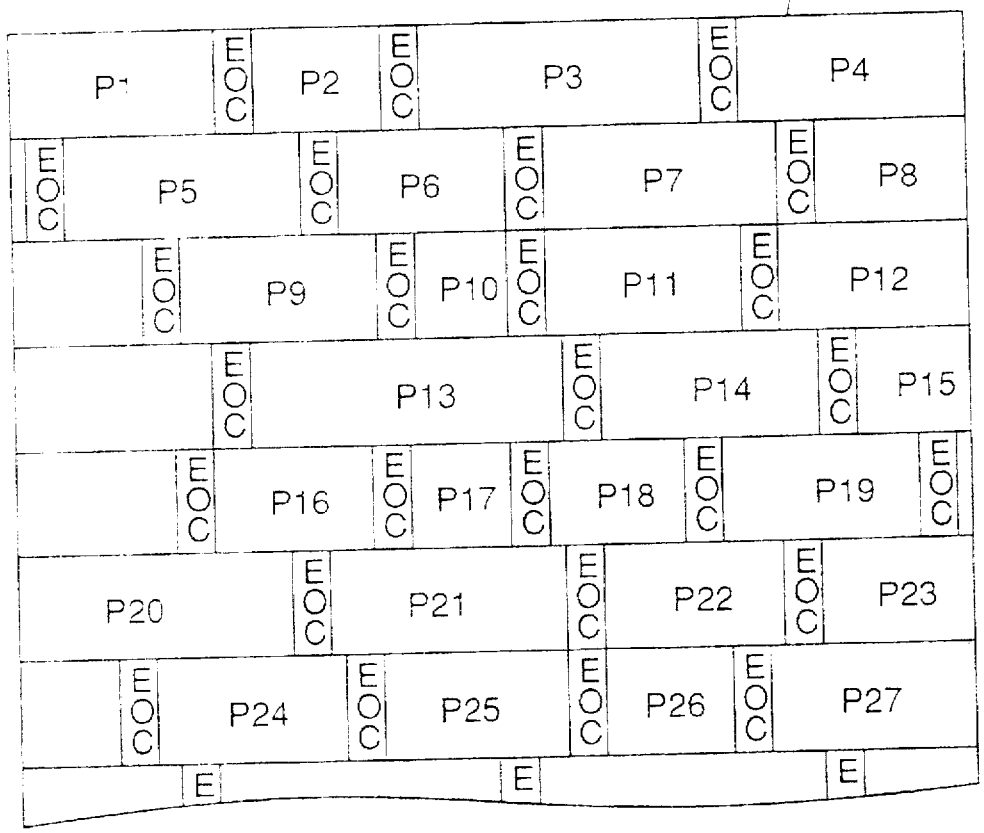
FIG. 1B is a diagram showing data stored in a block hierarchy parameter memory shown in FIG. 1A.
FIG. 1C is a diagram showing data stored in a block mode memory shown in FIG. 1A.

A process parameter memory 8 stores the parameter defining the execution state of the process, and comprises a block hierarchy parameter memory 9, such as shown in FIG. 1B, and a block mode memory 10, such as shown in FIG. 1C. The block hierarchy parameter memory 9 is used to store various parameters P1, P2, . . . , separated by EOC (end of code), and employs a defined block hierarchy. The block mode memory 10 stores the selected mode for each of the blocks.

A process parameter editor 12, also operated through a key board, is used to input the parameters which will be stored to the process parameter memory 8 by a block mode setting device 13 and a mode parameter setting device 14. The block mode setting device 13 sets a mode signal identifying the type of parameter for each block. The mode parameter setting device 14 sets only the parameters corresponding to the mode set by the block mode setting device 13 to the block hierarchy parameter memory 9.

Figure 1D:
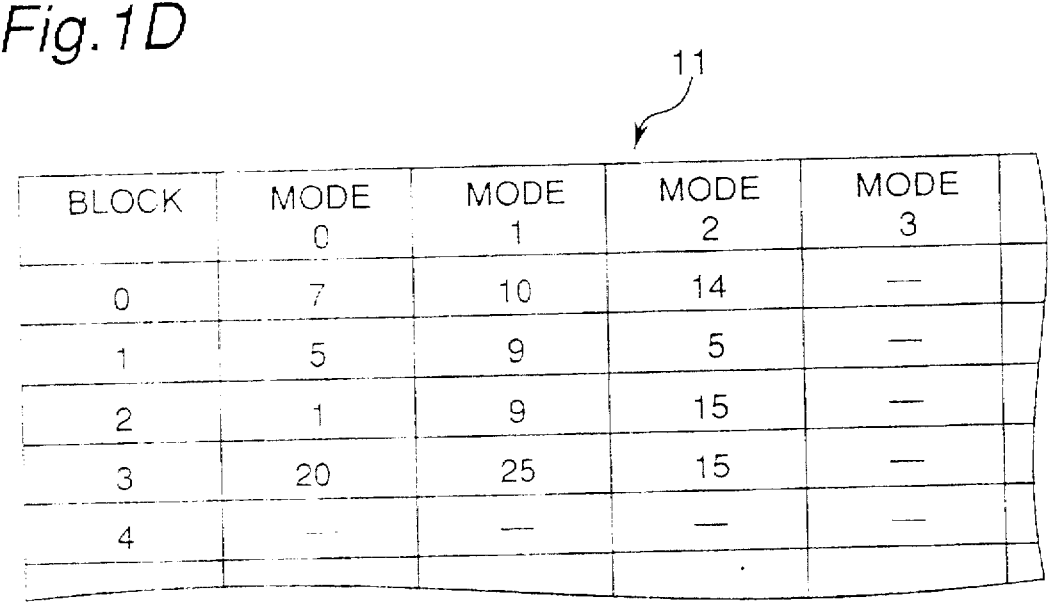
FIG. 1D is a diagram showing data stored in a process parameter type memory shown in FIG. 1A.

A process parameter type memory 11 stores a number of parameters used in each mode in various blocks, as shown in FIG. 1D. First, the concept of the terms "block" and "mode" used herein will be first explained.

Figure 7:
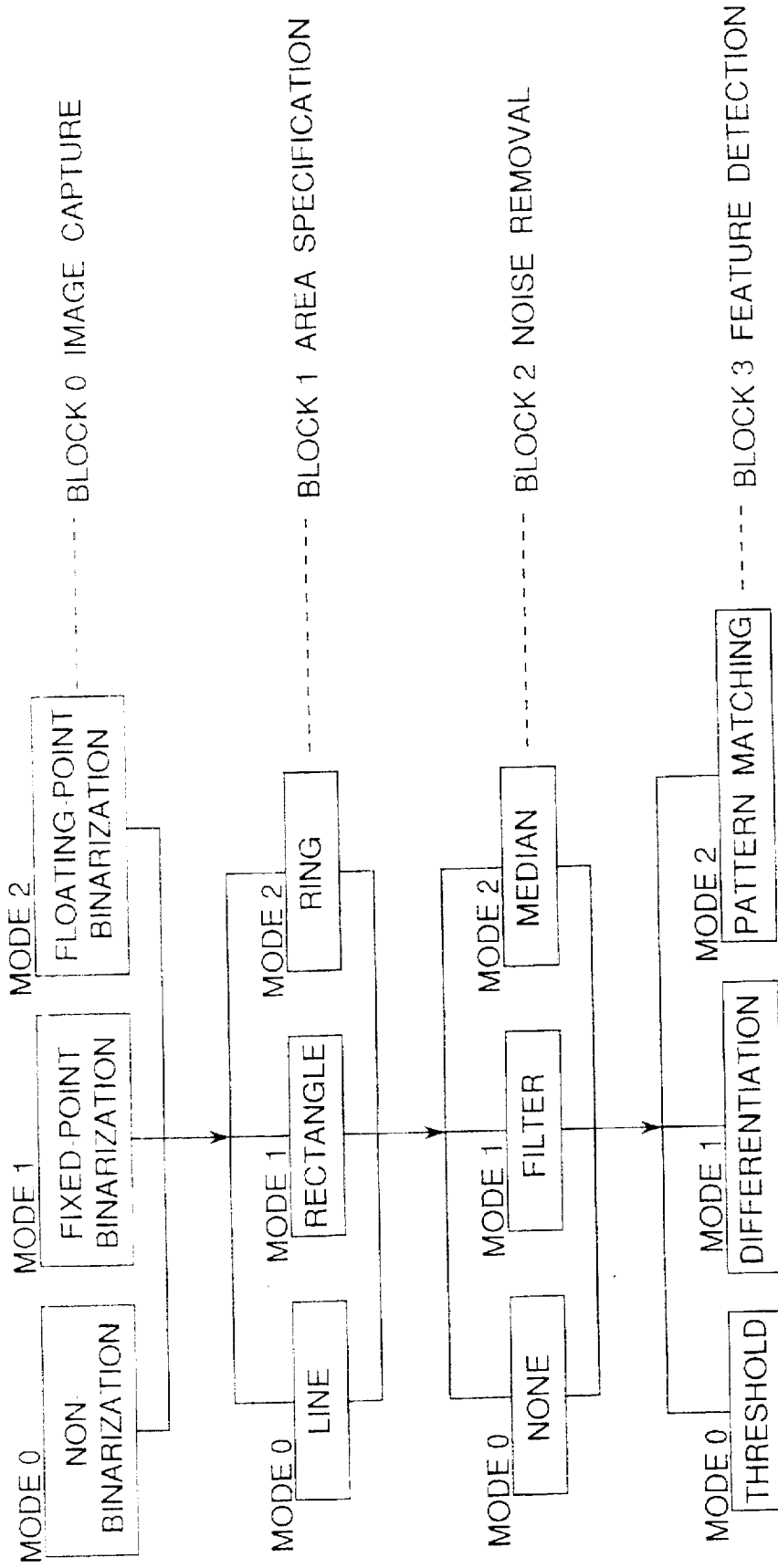
FIG. 7 is a diagram showing a process parameter management using a block hierarchy with application to an edge detection process executed by an image processing apparatus according to the first embodiment of the invention.

Referring to FIG. 7, a chart for detecting a feature, such as an edge feature, of an article by a video image is shown.

In the first step defined as a block 0, a black-and-white image of an article is captured, and this can be done either by the method of: a non-binarization method in which each pixel of the image of the article is expressed by gray level that takes a number of values between pure white and pure black; a fixed-point binarization method in which each pixel of the image is binary expressed representing black or white by using a predetermined threshold; or a floating-point binarization method in which each pixel of the image is binary expressed representing black or white by using a variable threshold determined, for example, by taking an average grey level of an entire image.

For effecting the non-binarization method, it is assumed that seven different parameters are used, such as a parameter representing the gray level number, a parameter representing the brightness level, a parameter representing a camera in which a plurality of cameras are set, and some other parameters. For effecting the fixed-point binarization method, it is assumed that ten different parameters are used, such as a parameter representing the fixed threshold level, and some others. For effecting the floating point binarization method, it is assumed that 14 different parameters are used, such as a parameter representing the method for obtaining the floating threshold level and others.

In some occasions, the user may wish to choose the non-binarization method when he or she wishes to have a detailed analyzing system, but in some other occasions the user may wish to choose the fixed-point binarization method when a rough but quick analyzing system is required. And, in other occasions, floating-point binarization method may be selected and used. These three choices of methods are referred to as mode 0, mode 1 and mode 2, respectively, and are included in block 0. Thus, according to the above example, in block 0, mode 0 takes seven parameters, mode 1 takes ten parameters, and mode 2 takes 14 parameters. These numbers of the parameters are previously known, and are stored in the process parameter type memory 11, as shown in FIG. 1D, second row from the top.

In the second step, an area for extracting the feature is set. For example, the area may be rectangle so that the edge of an article captured in the rectangle can be detected for examining, for example, the linearity of the edge. In another case, the area may be just a line segment, so that an edge point falling within the line can be detected. In yet another case, the area may be a ring, so that an arched edge can be detected for examining, for example, the radius of the curvature.

When line is selected for specifying the area, it is assumed that five parameters are used, such as a parameter representing the line mode, a parameter representing the value of X-coordinate of one end point, a parameter representing the value of Y-coordinate of one end point, a parameter representing the value of X-coordinate of another end point, and a parameter representing the value of Y-coordinate of another end point. When rectangle is selected for specifying the area, it is assumed that nine parameters are used, such as a parameter representing the rectangle mode, and eight parameters representing X-coordinate and Y-coordinate values of four corners of the rectangle. When ring is selected for specifying the area, it is assumed that five parameters are used, such as a parameter representing the ring mode, parameters representing X-coordinate and Y-coordinate values of a center of a ring, and parameters representing inner and outer radii. These numbers of parameters are stored in the process parameter type memory 11, as shown in FIG. 1D, third row from the top.

Depending on the subject to be examined, the user selects one of the the modes of line mode, rectangle mode and ring mode, which are designated as mode 0, mode 1 and mode 2, respectively, in block 1.

In the third step, a method for eliminating noise is specified. In the example shown in FIG. 7, the third step is defined as block 2, and there are three different modes in block 2, which are mode 0 for no noise elimination, mode 1 for noise elimination by a smoothing filter method, and mode 2 for noise elimination by a median method. User selects one of the three modes.

It is assumed that in block 2, mode 0 takes one parameter, mode 1 takes nine parameters and mode 2 takes 15 parameters. These numbers of parameters are stored in the process parameter type memory 11, as shown in FIG. 1D, fourth row from the top.

Finally, in the fourth step, a method for extracting the feature is specified. In the example shown in FIG. 7, the fourth step is defined as block 3, and there are three different modes in block 3, which are mode 0 for extracting the edge feature by the use of a threshold, mode 1 for extracting the edge feature by the use of a differentiation, and mode 2 for extracting the edge feature by the use of a pattern matching. It is assumed that in block 3, mode 0 takes 20 parameters, mode 1 takes 25 parameters and mode 2 takes 15 parameters. These numbers of parameters are stored in the process parameter type memory 11, as shown in FIG. 1D, fifth row from the top.

The data stored in memory 11 is used by the process parameter allocator 5 for parameter interpretation, and by the process parameter editor 12 for editing the parameters stored to the process parameter memory 8.

A mode detector 15 in the process performer 2 recognizes the mode signal applied to the process performer 2 to enable execution of the corresponding processes.

The operation of an image processing apparatus comprised as shown in FIG. 1A is described below.

First, using the key board, an operator selects one mode in every blocks. It is assumed that the operator has selected mode 0 for block 0, mode 1 for block 1, mode 1 for block 2 and mode 0 for block 3. Thus, the feature extraction process will be carried out such that: the image will be captured by the non-binarization method; the investigation will be done in a rectangle area; the noise elimination will be done by the filtering method; and the feature extraction will be done by the comparison with a threshold level.

The selected modes are set by the block mode setting device 13. Then, the selected modes are stored in the block mode memory 10. According to the above example, selected modes 0, 1, 1, 0 are stored in memory 10 as shown in FIG. 1C. Also, the selected modes are input to the process execution sequence editor 7 so that proper programs for executing the sequence of the process are selected and produced. The selected programs for the execution sequence are stored in the process execution sequence memory 6.

Then, the operator inputs specific values of the process parameters for the selected modes using the key board, and the input parameters are set by the mode parameter setting device 14 in the process parameter editor 12 based on the parameter format of the corresponding process as stored in the process parameter type memory 11. The set parameters are stored in block hierarchy parameter memory 9, in a manner shown in FIG. 1B, in which Pn (n=1, 2, 3, . . . ) represents a specific value of the Nth entry of the parameter, and EOC is the end of code. According to the above example, since the selected modes are modes 0, 1, 1, 0, for blocks 0, 1, 2, 3, respectively, the number of parameters for the selected modes are 7, 9, 9, 20, respectively, as understood from the data stored in process parameter type memory 11, as shown in FIG. 1D. Thus, in FIG. 1B, seven parameters P1–P7 are for mode 0 in block 0, next nine parameters P8–P16 for mode 1 in block 1, next nine parameters P17–P25 are for mode 1 in block 2, and next twnety parameters P26–P45 are for model 0 in block 3.

When teaching is completed and an on-line run command is applied to the process executor 3, the process executor 3 reads the programs for the process execution sequence from the process execution sequence memory 6; reads the parameters applied to the corresponding process based on the format stored to the process parameter type memory 11 from the process parameter memory 8; and automatically executes the image process by sequentially applying the parameters and starting each process of the process performer 2. During process execution, the process performer 2 outputs the results which are stored to the measured value memory 1.

When the process performer 2 is run by the process executor 3, the process parameter allocator 5 reads only the preselected number of parameters corresponding to the mode signal based on the corresponding process parameter format stored to the process parameter type memory 11, and applies the parameters to the process performer 2. The process parameter allocator 5 may be a controller which controls the timing for sending out the parameters from the block hierarchy parameter memory 9, or may be a compiler which controls the translation of the parameter from block hierarchy parameter memory 9 to some machine language. The process performer 2 then executes the process according to the mode signal supplied to the mode detector 15.

It is therefore possible by the first embodiment thus comprised to conserve memory requirements because parameters can be efficiently stored even when the number of parameters supplied to the processes becomes large. This makes it possible to construct a sufficiently practical image recognition processing logic executable even by low memory capacity image processing apparatuses used for factory automation. As shown in FIG. 7, there are many different ways of achieving a given objective in the field of image processing, and it is therefore necessary to select the best (most appropriate) method based on the shape of the subject, image contrast, the required precision, and processing speed. As a result, not all of the available methods are used: only the essential processing components are selected from each block.

The present invention uses these characteristics of the image processing apparatus for factory automation to adaptively select and group the small processing units of the conventional process corresponding to the 'modes' shown in FIG. 7 on the larger 'edge detection' process level. This makes it possible to construct an image recognition process using fewer procedures, and results in an extremely easy-to-use, practical image processing apparatus.

It is also possible by the present invention to easily add new functions and upgrade the software by adding new modes because the parameters pre-stored to the process parameter memory 8 can be rewritten to a different format by changing the mode.

Second Embodiment

The second embodiment of the invention is described next below with reference to FIG. 2A. Note that like parts in FIGS. 1A and 2A are identified by like reference numbers, and further description thereof is omitted below.

Figure 2A:
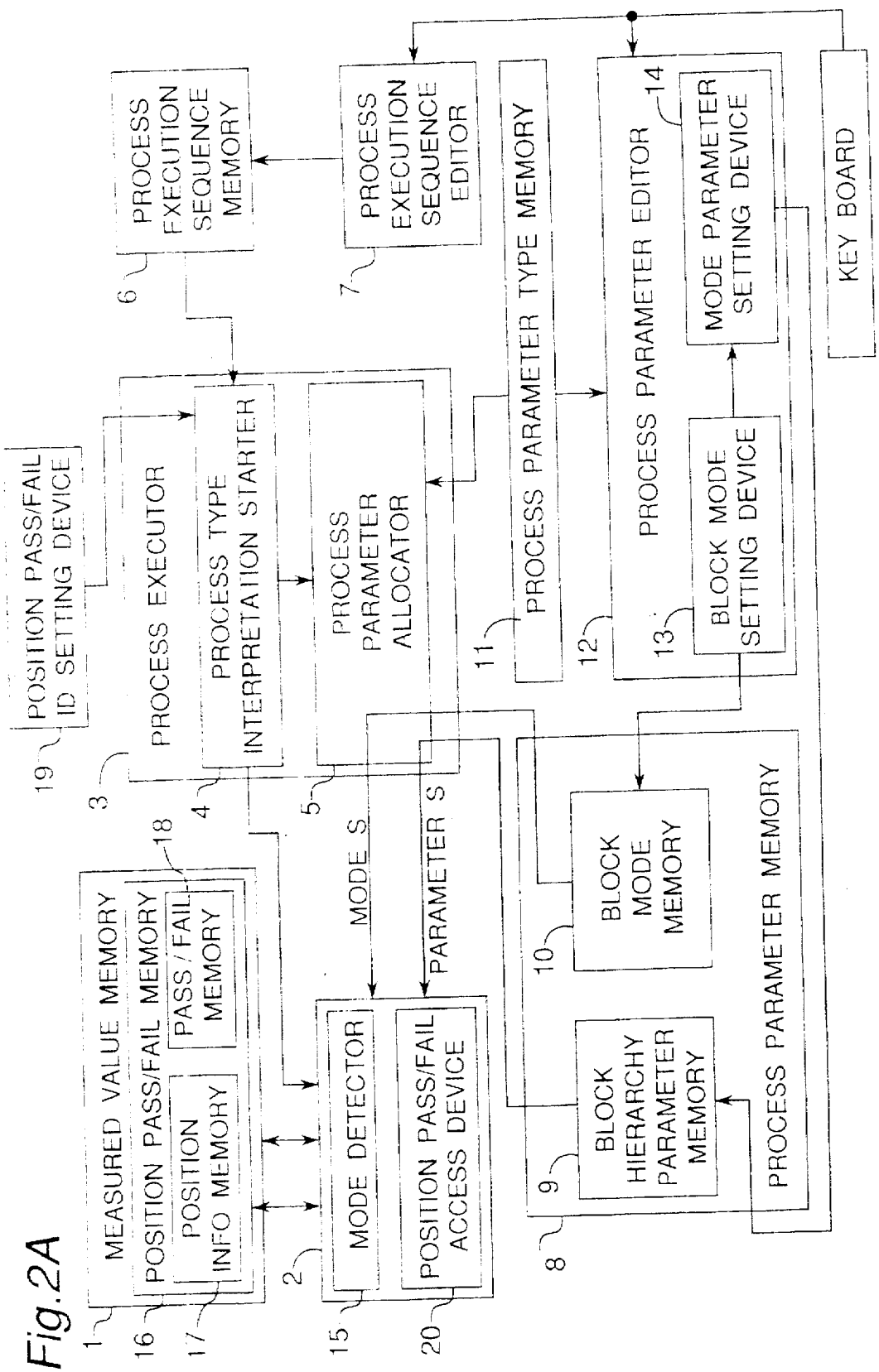
FIG. 2A is a block diagram of an image processing apparatus according to a second embodiment of the present invention.

Referring to FIG. 2A, when compared with the first embodiment, the second embodiment further has a position pass/fail memory 16 with a position information memory 17 and a pass/fail memory 18, a position pass/fail ID setting device 19, and a position pass/fail access device 20.

Figure 2B:
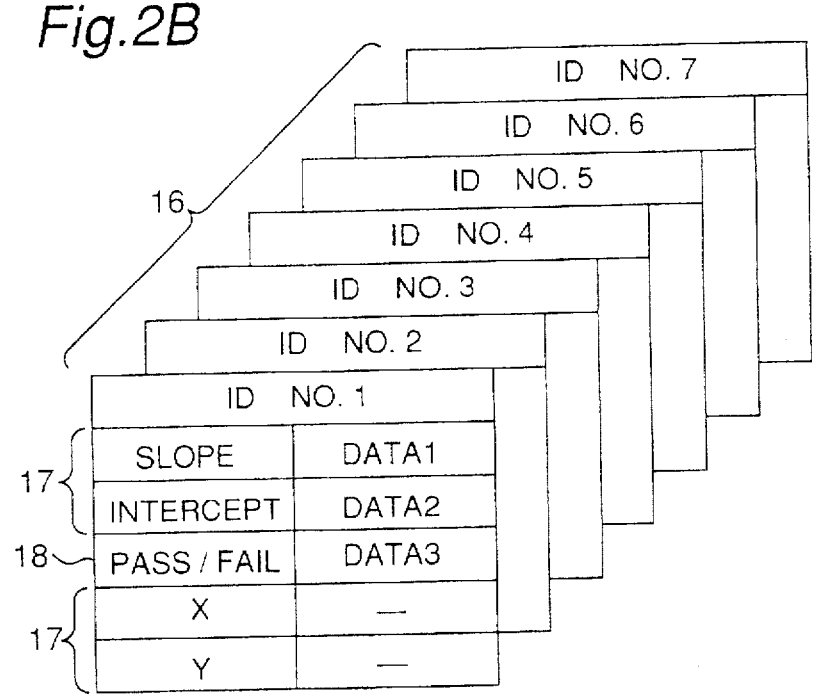
FIG. 2B is a diagram showing data storing format in a position pass/fail memory shown in FIG. 2A.
Figure 2C:
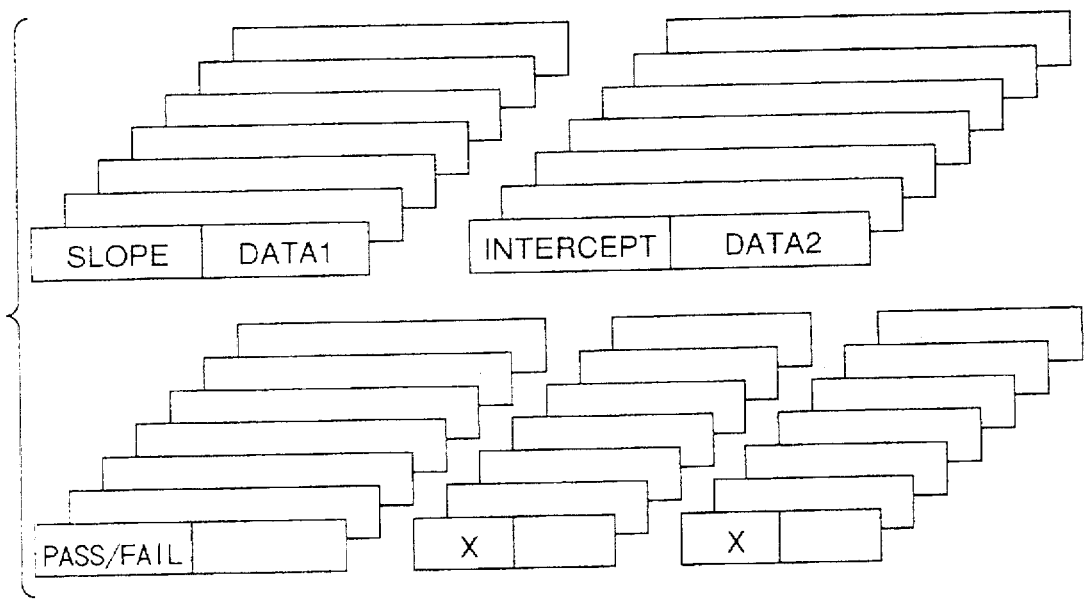
FIG. 2C is a view similar to FIG. 2B, but showing data storing format used in the prior art.

The position pass/fail memory 16 is provided within the measured value memory 1 and stores the image (subject) position and pass/fail information, such as shown in FIG. 2E. The position information memory 17 stores the position information, such as slope data, intercept data, X-coordinate data and Y-coordinate data, generally called geographical data. The geographical data are produced, as a process result, from the process performer 2. The pass/fail memory 18 stores the pass/fail information, i.e., a quality data indicative of quality of the geographical data. The pass/fail information (quality data) is also output as a process result of the process performer 2. In contrast to the format for the memory 16 shown in FIG. 2B, the format for the prior art memory is as shown in FIG. 2C in which the separate items are stored in separate areas without any interconnection.

A position pass/fail ID setting device 19 is used to set unique ID (identification) numbers or ID names to a group of information gathered in the position pass/fail memory 16. The format that gathers the group of information is referred to as an information sheet. The position pass/fail access device 20 is used for accessing the position pass/fail memory 16 using the ID set by the position pass/fail ID setting device 19.

The operation of an image processing apparatus comprised as shown in FIG. 2A is described below.

In the image processing apparatus of this embodiment, when the process performer 2 is run by the process executor 3, the data to be accessed in the measured value memory 1 is arranged in an information sheet specified by an ID number added by the position pass/fail ID setting device 19. Each information sheet contains a group of different data required for the corresponding process. When the process executor 3 is then activated using these settings, the process performer 2 uses the position pass/fail access device 20 to access the position pass/fail memory 16 for reading/writing based on the ID set by the position pass/fail ID setting device 19.

Figure 8:
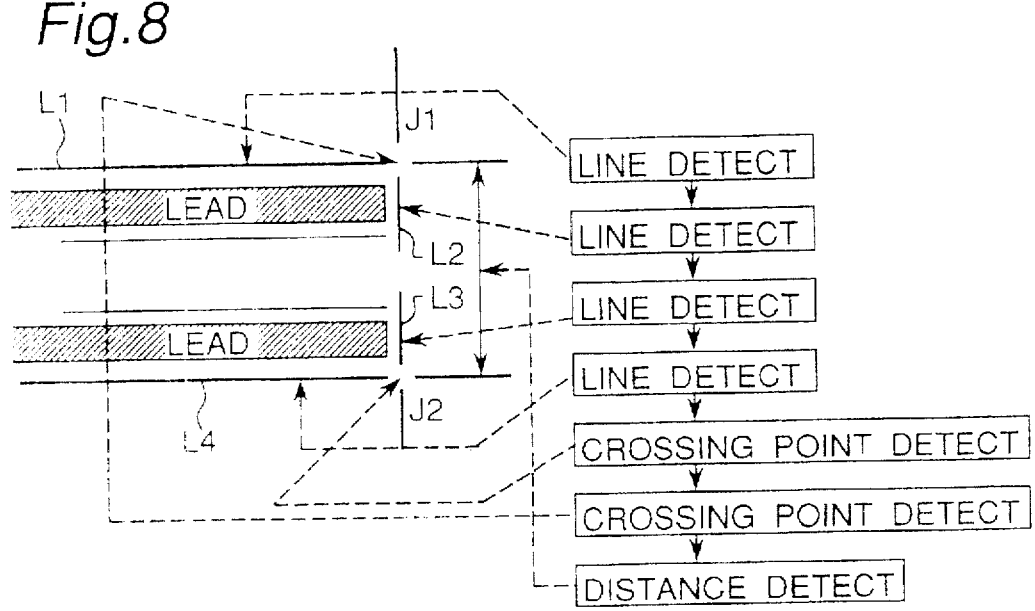
FIG. 8 is a diagram showing an operation of a process sequence for inspecting the curvature of lead wires to a component by an image processing apparatus according to the second embodiment of the invention.
Figure 9:
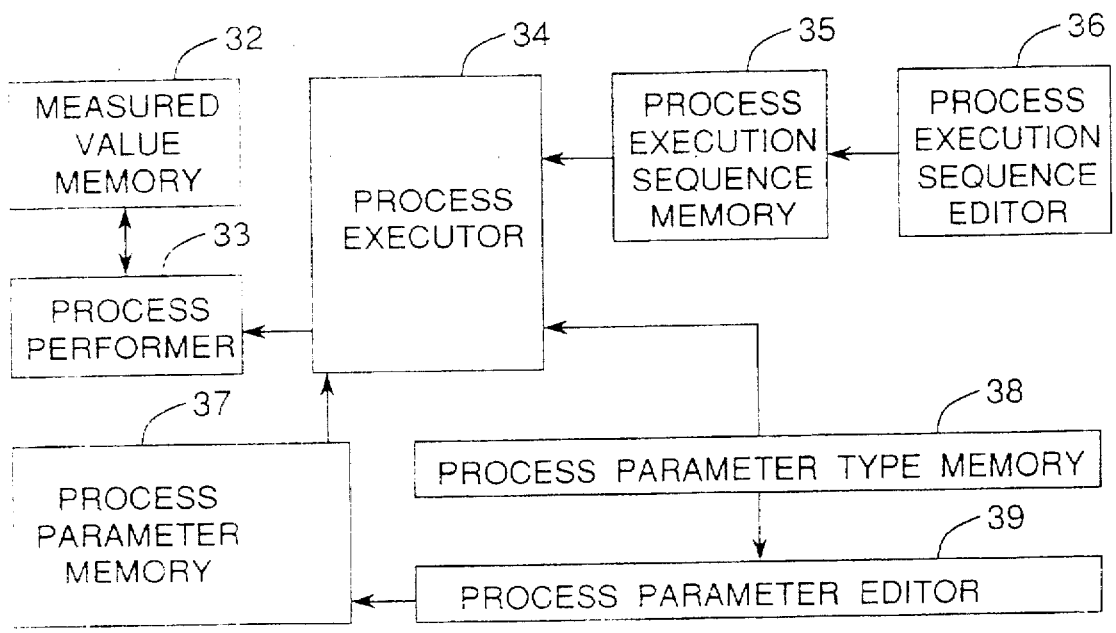
FIG. 9 is a block diagram of a conventional sequential process execution-type image processing apparatus.
Figure 10:
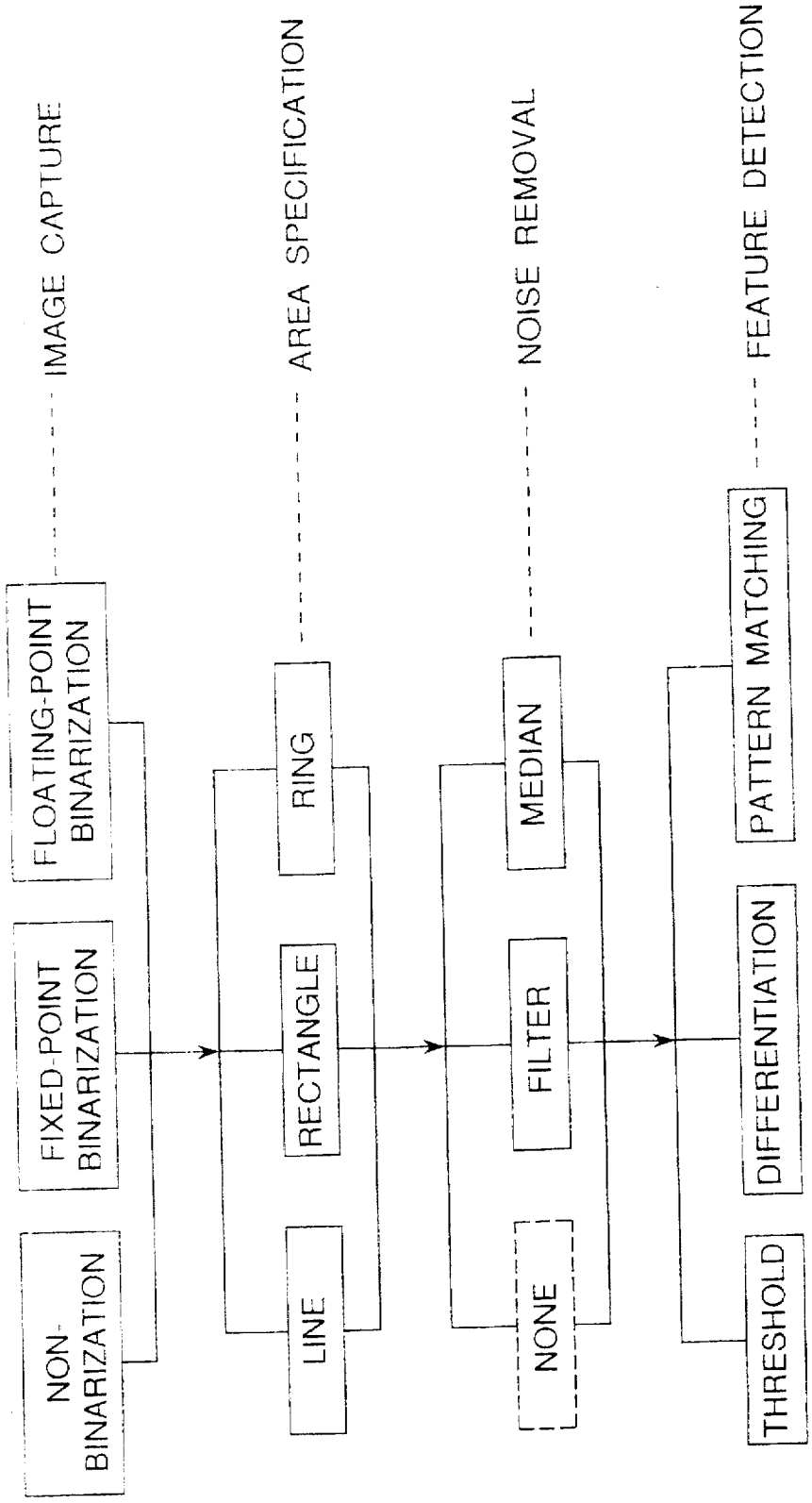
FIG. 10 is a diagram showing the processes required to detect the edges of a target object, and the corresponding conventional process sequence.

The process example shown in FIG. 8 inspects the outer distance between the leads by a combination of processes. The first step is to execute the line detection process four times to detect the four lines L1, L2, L3 and L4 along the leads. To detect the end positions of the leads, intersection J1 of the two lines L1 and L2 and intersection J2 of the two lines L3 and L4 are obtained. The coordinates of the two intersections J1 and J2 are obtained. Then, a distance D between the two intersections J1 and J2 is detected. Then, the inspection terminates. After each detection of L1, L2, L3, L4, J1, J2 and D, it is examined that the detection is passed or failed.

The measured value data obtained by the example shown in FIG. 8 through the apparatus of the present invention and that of the prior art are indicated in Table 1.

In the example shown in Table 1, the data content of the position information memory 17 stores the "slope" "intercept" "X coordinate" and "Y coordinate" data; and the pass/fail memory 18 stores the "pass" or "fail" result information. The input and output columns under "Invention" in Table 1 show the ID numbers identifying the data set in the position pass/fail memory 16.

TABLE 1

| Detection | Invention | | Prior art | |
|---|---|---|---|---|
| Process | Input | Output | Input | Output |
| L1 | — | ID1 | — | S1, I1, P/F1 |
| L2 | — | ID2 | — | S2, I2, P/F2 |
| L3 | — | ID3 | — | S3, I3, P/F3 |
| L4 | — | ID4 | — | S4, I4, P/F4 |
| J1 | ID1, ID2 | ID5 | S1, I1, P/F1, S2, I2, P/F2 | X1, Y1, P/F5 |
| J2 | ID3, ID4 | ID6 | S3, I3, P/F3, S4, I4, P/F4 | X2, Y2, P/F6 |
| D | ID5, ID6 | ID7 | X1, Y1, P/F5, X2, Y2, P/F6 | P/F7 |
| Sub Total | 6 | 7 | 18 | 19 |
| Total | | 13 | | 37 |

Note:
S1, S2, S3, S4 are data for "slope";
I1, I2, I3, I4 are data for "intercept";
X1, X2 are data for "X coordinate";
Y1, Y2 are data for "Y coordinate"; and
P/F1–P/F7 are data for "pass/fail" test.

Table 1 is described below. The line detection process for detecting line L1, L2, L3 and L4 is first executed four times, each time returning three result values: the slope and intercept of the line, and whether line detection was executed successfully. The conventional process as shown in Table 1 must define three numbers or names identifying each of these results separately. The present embodiment, however, requires only a single ID value specifying a certain information sheet in the position pass/fail memory 16. The process obtaining the intersection J1 of two lines L1 and L2 is then executed twice, and for this purpose, the previously obtained results for the two lines L1 and L2 must be input. In this case, the conventional method requires six settings, but the method of the second embodiment of the invention only requires two ID settings, ID1 and ID2, to identify the two lines L1 and L2.

The process obtaining the distance between the two intersections J1 and J2 is then executed, requiring the line intersection coordinates to be input. In this case, too, the conventional method requires six values, but the method of the invention requires only the two IDs, ID5 and ID6, identifying the two intersections J1 and J2.

The number of name or number settings identifying the inputs and outputs required to achieve the above process is a total of 37 by the conventional method and only 13, or approximately one-third, by the method of the second embodiment of the present invention as shown in Table 1. Because the number of required settings is thus reduced relative to the conventional method, a user-friendly, easy-to-use image processing apparatus can be provided. Furthermore, the process inputs and outputs are standardized by the present embodiment to identify the position, pass/fail result, and 'other measured values,' making it easier to link software modules between processes. This format is also consonant with the major objectives of image processing apparatuses for factory automation applications, specifically positioning and pass/fail evaluation tasks. As a result, the method of the invention can be applied to many processes, and provides a format whereby processes can be written in an object-oriented manner. It should be further noted that recognition logic systems can be built for an extremely wide range of applications by simply connecting position detection and pass/fail processes, and an apparatus with excellent general purpose applicability can therefore be provided.

Third Embodiment

The third embodiment of the invention is described next below with reference to FIG. 3A. Note that like parts in FIGS. 1A and 3A are identified by like reference numbers, and further description thereof is omitted below.

Figure 3A:
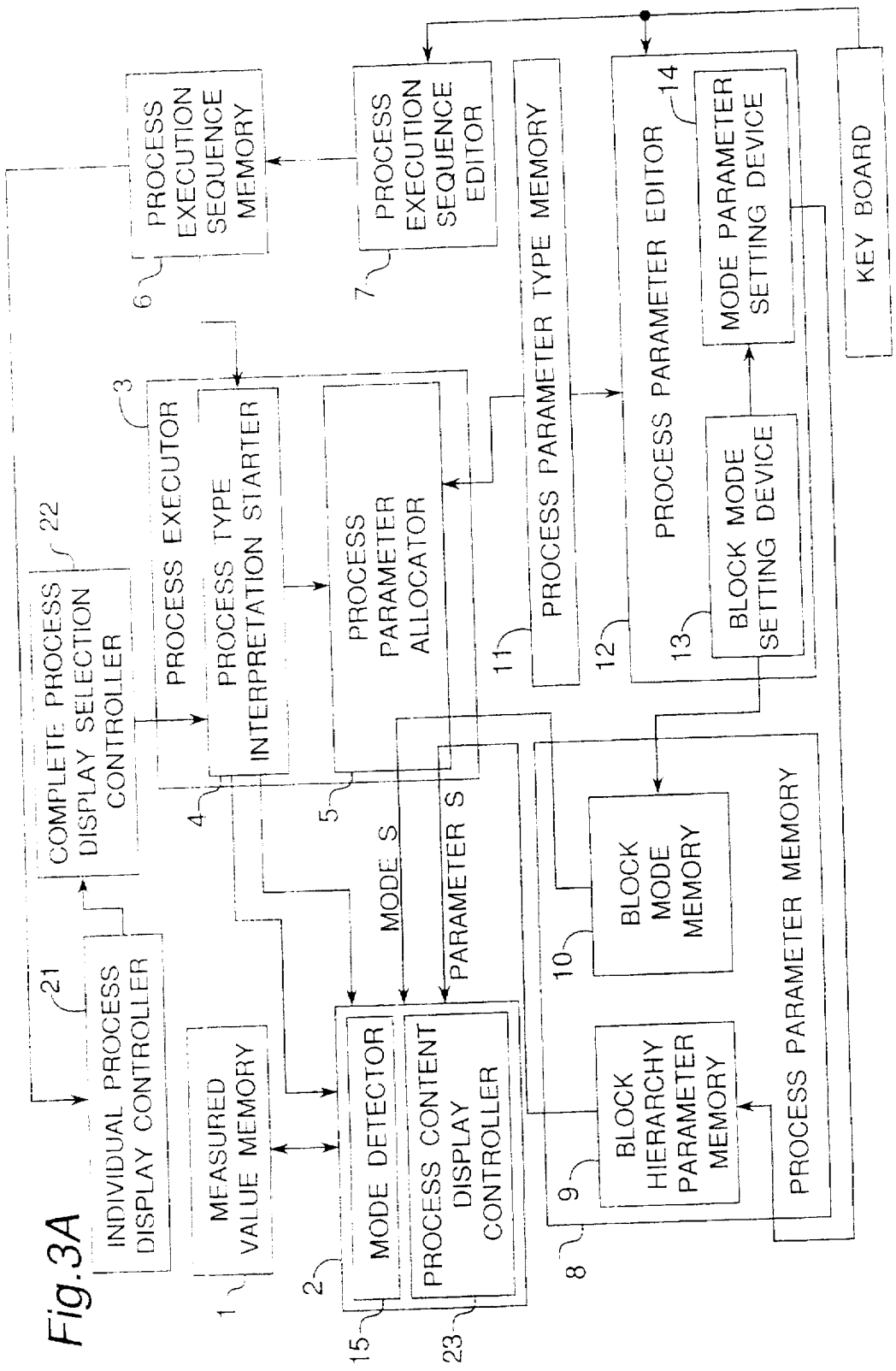
FIG. 3A is a block diagram of an image processing apparatus according to a third embodiment of the present invention.

Referring to FIG. 3A, when compared with the first embodiment, the third embodiment further has an individual process display controller 21, a complete process display selection controller 22, and a process content display controller 23 in the process performer 2.

The individual process display controller 21 selects whether to display or not display each of the contents of individual processes. The complete process display selection controller 22 selects and sets one of three modes of all-on mode in which data of all process executions are displayed, all-off mode in which data of all process executions are not displayed, and selected data display mode in which data selected by the individual process display controller 21 are displayed. And the process content display controller 23 of the process performer 2 displays the process contents.

The operation of an image processing apparatus comprised as shown in FIG. 3A is described below.

In the image processing apparatus of this embodiment, when the process performer 2 is run by the process executor 3, the process content display controller 23 of the process performer 2 can display on a television monitor or other display device the content of the processes executed for the actual image being evaluated, thereby keeping the user informed. Possible display contents include displaying a cursor at the resulting (detected) position, and a density graph of the processed area.

It is normal during automated operation on an assembly line, however, to not display any more than the minimum required display information in order to reduce processing requirements and thereby increase system throughout. The individual process display controller 21 is used to select the information displayed. During system start up and adjustment, it is also preferable to be able to display or not display all process contents. This becomes tedious when there are many processes and each process must be separately set to display or not display using the individual process display controller 21. In the present embodiment, therefore, a complete process display selection controller 22 is provided so that the user can easily select whether to display or not display all process contents.

A further operation of this third embodiment is described below in connection with the example of the distance measuring process shown in FIG. 8 that includes seven processes for obtaining seven data L1–L4, J1, J2 and D.

First, the user sets the display mode for each of the seven processes using the individual process display controller 21, such as shown in FIG. 3B, box B1. In the boxes in FIG. 3B, "0" and "1" under the column "display" represent display OFF and display ON, respectively. Thus, according to the data indicated in box B1, it is understood that the operator has used the individual process display controller 21 to set such that processes for detecting lines L1–L4 are not to be displayed, and processes for detecting intersections J1 and J2 and distance D are to be displayed. Even with such a setting as shown in box B1, the operator may occasionally wish to see the processes for detecting lines L1–L4, that is to see all the processes in the list. In such a case, despite the setting done by the individual process display controller 21, the complete process display selection controller 22 is operated to produce a code 1101 indicating the all-on mode so that all processes are forcibly displayed. In this case, the data for controlling the display is temporarily changed to that shown in box B3. Thus, data for all the seven processes will be displayed on the monitor. In some other occasions, the operator may wish not to see any of the processes in the list. In such a case, despite the setting done by the individual process display controller 21 the complete process display selection controller 22 is operated to produce a code "01" indicating the all-off mode so that all processes are forcibly erased. In this case, the data for controlling the display is temporarily changed to that shown in box B2. Thus, no data will be displayed through the monitor. Normally, the complete process display selection controller 22 is set to produce a code "11" indicating the selected data display mode so that the display is effected to the selected data as requested by the individual process display controller 21. In this case, the data for controlling the display is maintained in the condition as shown in box B4, which is equal to the condition as set by the individual process display controller 21.

In operation, the display on/off signals for each process set by the individual process display controller 21, and the display-all-processes on/off signal as forcibly altered by the complete process display selection controller 22, are both passed through the process executor 3 to the process performer 2. The process content display controller 23 of the process performer 2 receives these individual process on/off signals and the display-all-processes on/off signal, and effects the display according to the received signal. Table 2 illustrates the logic operation of the display on/off signal at this time.

TABLE 2

| Controller 22 | Controller 21 | Controller 23 |
| --- | --- | --- |
| 01 | Display OFF | Display OFF |
| 01 | Display ON | Display OFF |
| 10 | Display OFF | Display ON |
| 10 | Display ON | Display ON |
| 11 | Display OFF | Display OFF |
| 11 | Display ON | Display ON |

In Table 2, when controller 22 is so set to produce code "01" (all-off mode), no matter what the setting is done by the controller 21, controller 23 controls the monitor not to display the process. When controller 22 is so set to produce code "10" (all-on mode), no matter what the setting is done by the controller 21, controller 23 controls the monitor to forcibly display the process. And, when controller 22 is so set to produce code "11" (selected data display mode), controller 23 controls the monitor to display as requested by controller 21.

It is to be noted that while two signals are applied to the process content display controller 23 in the above embodiment, logic control as shown in Table 2 can be applied by the complete process display selection controller 22 so that only one signal is applied to the process content display controller 23.

By thus comprising a process display controller for individual processes, a process display controller for displaying the contents of all sequentially executed processes, and a process performer for displaying the process contents based on the display control signals input thereto, an image processing apparatus according to the third embodiment enables precise display control for the purposes of displaying only the required control items and reducing processing overhead and processing time while also enabling easy batch selection for displaying all process contents. The result is an easy-to-use image processing apparatus.

Fourth Embodiment

The fourth embodiment of the invention is described next below with reference to FIG. 4. Note that like parts in FIGS.

1A and 4 are identified by like reference numbers, and further description thereof is omitted below.

Figure 4:
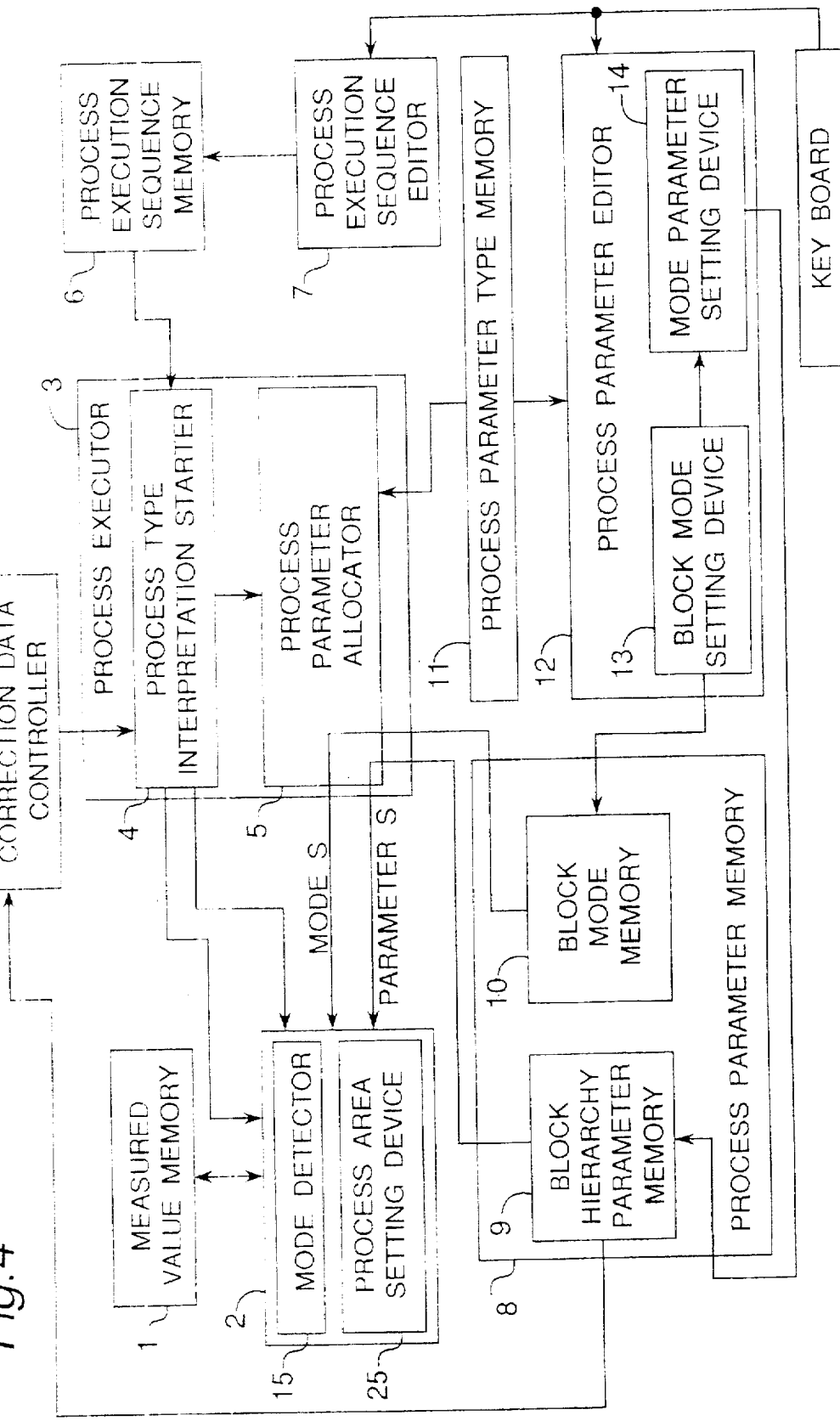
FIG. 4 is a block diagram of an image processing apparatus according to a fourth embodiment of the present invention.

Referring to FIG. 4, when compared with the first embodiment, the fourth embodiment further has an process area correction data controller 24 and a process area setting device 25. The process area correction data controller 24 is used to set the shape of the process area and the method of compensating for variations in the detected shape. The process area setting device 25 in the process performer 2 reads the position data stored to the measured value memory 1, applies any position correction required, and sets the process area.

The operation of an image processing apparatus comprised as shown in FIG. 4 is described below.

With the image processing apparatus of this embodiment, the area to be processed within the image is limited, and processing is restricted to this defined area. This area is not fixed relative to the camera, but is within a known range. It is therefore necessary to detect is a known reference position, and then shift the process area by an amount equal to the offset between the defined and detected reference positions. For example, a known mark on a printed circuit board positioned with poor precision is first recognized, and is then used as the reference point for detecting the presence of other components.

This is accomplished in the present embodiment by the user first setting, by the process area correction data controller 24, the shape, position, and correction method of the area used as the reference. During process execution, the process area setting device 25 of the process performer 2 reads the position data from the measured value memory 1, applies position correction based on the correction method set by the process area correction data controller 24, and thus sets the process area. Possible correction methods include pre-calculating the relative position from the reference position in a separate process, and adding this relative position to the reference position set by the process area correction data controller 24 to determine the position of the process area; and directly reading the X-Y coordinates returned in the process result to obtain the center of a circle when the objective is centering to a round process area.

As described above, an image processing apparatus according to the fourth embodiment comprises a means common to all processes for editing and storing process area shape and correction data, and a means for setting up processes for reading position information from a measured value memory and setting the position of the process area. It is therefore possible to easily achieve an image processing apparatus whereby position correction of the process area, a common operation, can be accomplished.

When this fourth embodiment is used in combination with the second embodiment described above, position data can be set by simply specifying the ID of the position pass/fail memory 16 in the measured value memory 1, and a user-friendly system with few parameter settings can be achieved. As shown in Table 1 used in reference to the second embodiment of the invention, the number of measured position settings is approximately one-third that of the conventional method.

Fifth Embodiment

The fifth embodiment of the invention is described next below with reference to FIG. 5. Note that like parts in FIGS. 1A and 5 are identified by like reference numbers, and further description thereof is omitted below.

Figure 5:
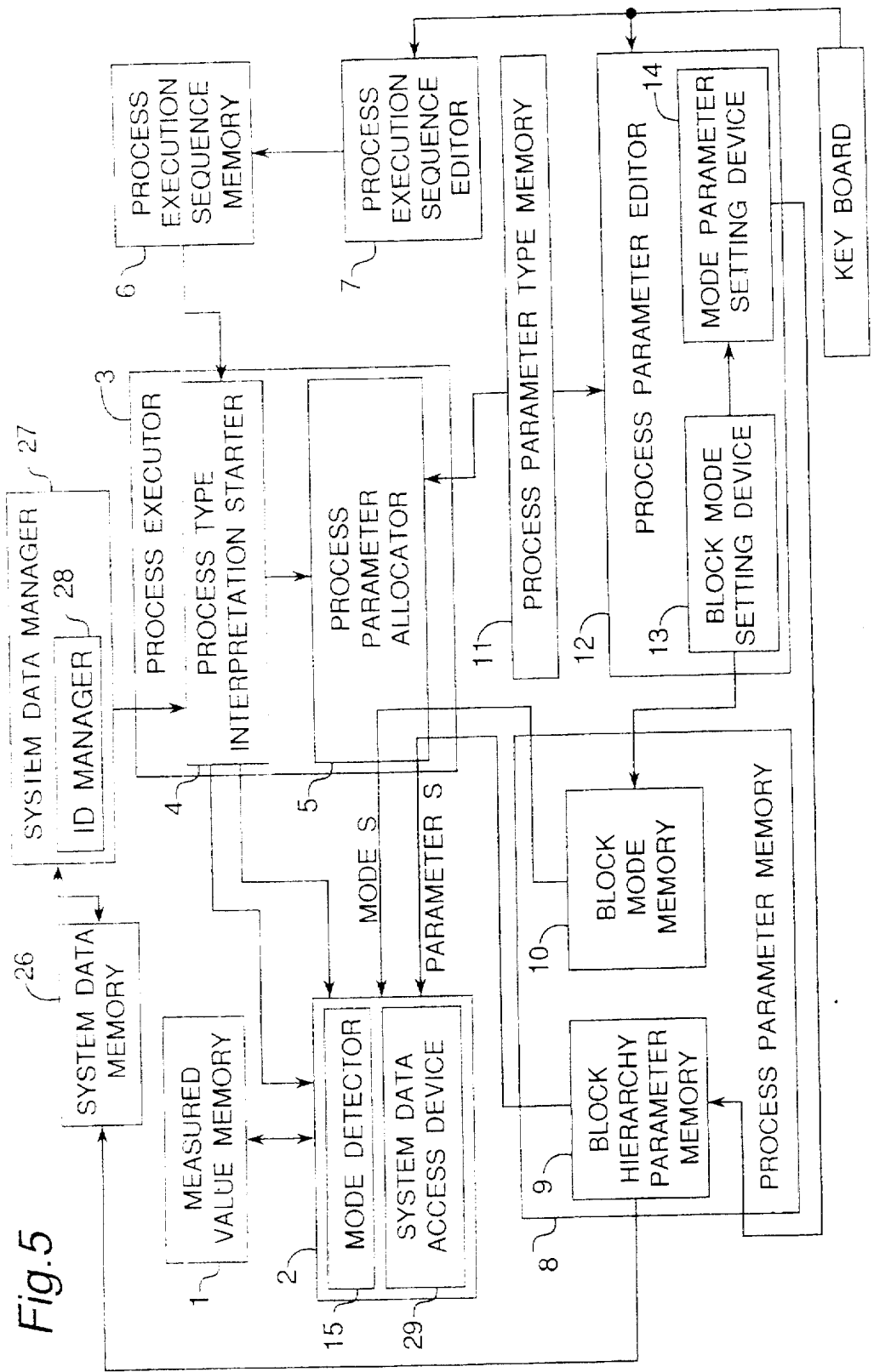
FIG. 5 is a block diagram of an image processing apparatus according to a fifth embodiment of the present invention.

Referring to FIG. 5, when compared with the first embodiment, the fifth embodiment further has a system data memory 26, a system data manager 27, an ID manager 28 and a system data access device 29. The system data memory 26 stores data separately from the means storing the parameter data applied during process execution. The system data manager 27 controls the data stored to the system data memory 26. The ID manager 28 of the system data manager 27 accesses the system data required for the current process by a unique name or number as parameter data applied to the process. The system data access device 29 of the process performer 2 is used to access system data as process parameters.

The operation of an image processing apparatus comprised as shown in FIG. 5 is described below.

It is possible by this embodiment to batch manage the parameters common to each process in the process performer 2 across the entire process. Management items include listing and editing data. Parameters common to plural processes may include the ID data of the position pass/fail memory 16 used in the second embodiment of the invention; the display on/off data of the third embodiment; and the process area correction data of the fourth embodiment.

In pattern matching processes using partial images, the partial images used for comparison must first be taught to the system as parameters. Large data parameters such as image data, however, can push the memory limits of factory automation systems, and it is therefore necessary to use such data sparingly. This can be accomplished by sharing data between processes. The system data memory 26 is thus provided to store parameters common to plural processes. The system data manager 27 is constructed to access the system data stored in the system data memory 26 and needed for the current process by the unique name or number obtained from the ID manager 28. When the process performer 2 operates, the system data ID is obtained from the ID manager 28 through the process executor 3, and supplied therefrom to the process performer 2.

Based on the system data ID, the system data access device 29 of the process performer 2 obtains the required system data from the system data memory 26 as parameters for the process. Note that while the ID number is read directly from the system data manager 27 in this example, it is also possible to store the ID to the process parameter memory 8 when setting the system data with the system data manager 27, and to obtain only the ID during execution as a parameter managed in a block hierarchy. System data thus managed can also be listed and edited by the system data manager 27 using the ID from the ID manager 28 as the key.

By thus comprising a means for storing data separately from the means storing the parameter data applied during process execution, and a means for accessing the system data required for the current process by a unique name or number as parameter data applied to the process, it is possible to batch list and set parameters common to plural processes, to share large capacity parameter data between processes, and thereby provide an image processing apparatus that is extremely easy to use.

Sixth Embodiment

The sixth embodiment of the invention is described next below with reference to FIG. 6A. Note that like parts in FIGS. 1 and 6 are identified by like reference numbers, and further description thereof is omitted below.

Figure 6A:
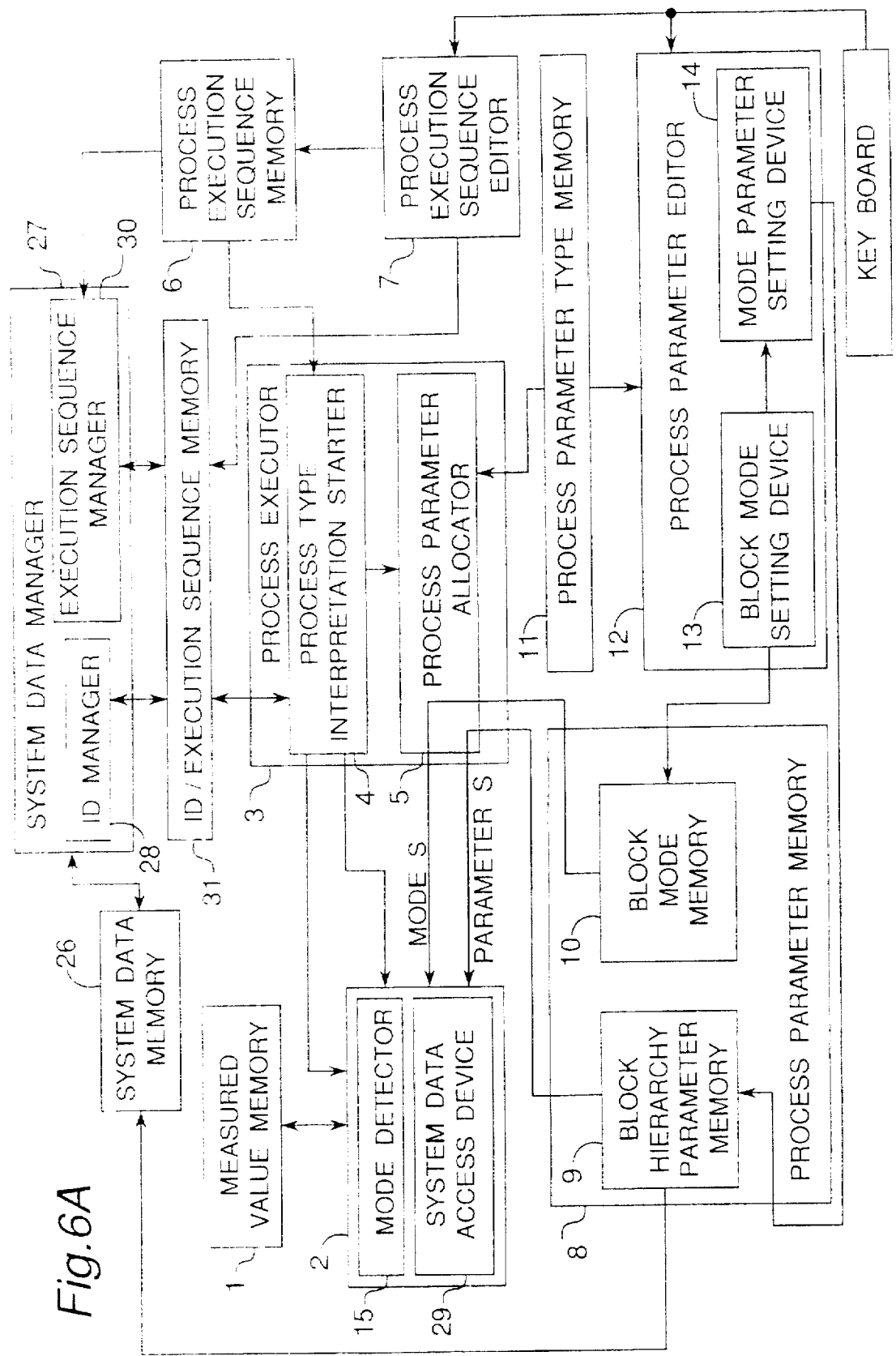
FIG. 6A is a block diagram of an image processing apparatus according to a sixth embodiment of the present invention.

Referring to FIG. 6A, when compared with the fifth embodiment, the sixth embodiment further has an execution sequence manager 30 and an ID/execution sequence memory 31. The execution sequence manager 30 operates in conjunction with the process execution sequence memory 6 to manage system data, and the ID/execution sequence memory 31 stores the system data IDs and the corresponding execution sequence.

The operation of an image processing apparatus comprised as shown in FIG. 6A is described below.

The embodiment shown in FIG. 6A is specifically related to controlling access to and editing of system data having the same ID in plural processes. For example, if a given ID is assigned to plural processes, that ID resource can be released for reuse only when it is no longer assigned to any single process. Control of plural processes is accomplished in this sixth embodiment by the ID/execution sequence memory 31 storing system data IDs and the corresponding execution sequence, and the execution sequence manager 30 managing system data in conjunction with the process execution sequence memory 6.

The operation of the execution sequence manager 30 is shown in FIGS. 6B–6K, inclusive.

In FIGS. 6B, 6E, 6H and 6K, the first column shows the execution sequence number, the second column shows the ID number indicating the system data that is being used, and the third column shows the type of process that is being executed, in which "IMAGE" means image capturing process, "EDGE" means edge detection process, "LINE" means line detection process, and "CIRCLE" means circle detection process.

In FIGS. 6C, 6F, 6I and 6L, the table therein shows only the processes in which the system data is used, and such a Table is stored in the ID/execution sequence memory 31. In FIGS. 6C, 6F, 6I and 6L, the first column shows the execution sequence number and the second column shows the ID number indicating the system data that is being used.

In FIGS. 6D, 6G, 6J and 6M, the table therein shows the condition whether the system data indicated by ID number 1, 2 or 3 is used, or not.

FIGS. 6B, 6C and 6D show the process execution sequence in a given process and whether system data is used in the corresponding process; the state of the ID/execution sequence memory 31; and whether the system data is used or unused.

FIGS. 6E, 6F and 6G are the same as FIGS. 6B, 6C and 6D except for the elimination from the process sequence of the process third in the execution sequence.

FIGS. 6H, 6I and 6J are the same as FIGS. 6E, 6F and 6G except for the elimination from the process sequence of the process second in the execution sequence.

FIGS. 6K, 6L and 6M are the same as FIGS. 6H, 6I and 6J with the addition of a process to the execution sequence.

Referring to FIGS. 6B, 6C and 6D, if there are processes in which system data is not used, there will also be duplication of IDs. The ID/execution sequence memory 31 stores the execution sequence and system data IDs only for execution sequences in which system data is used.

When the process third in the execution sequence is eliminated (changing data from FIGS. 6B, 6C and 6D to FIGS. 6E, 6F and 6G), the process that was fourth in the execution sequence in FIGS. 6E, 6C and 6D is shifted up and becomes third in sequence. At this time the ID/execution sequence memory 31 searches for a data set corresponding to execution sequence 3, and deletes the data. As in execution sequence control, the execution sequence following the deleted sequence is shifted up. All data sets following the deleted set are also located to confirm whether the system operating conditions have changed, or more specifically whether the ID stored to the ID/execution sequence memory 31 still matches the system operating conditions. If the conditions match, nothing further happens.

When execution moves from the state shown in FIGS. 6E, 6F and 6G to that shown in FIGS. 6H, 6G and 6J, the execution sequence is adjusted by the same operation applied between FIGS. 6B, 6C and 6D and FIGS. 6E, 6F and 6G. ID management is similarly executed, but in this case the ID stored to the ID/execution sequence memory 31 does not match the system operating conditions, i.e., ID1 is not present and system data ID1 is therefore unused. It is therefore possible to control access by plural processes to the same ID.

By thus comprising a means for storing the process execution sequence and names or numbers identifying system data, and a means for managing the system data using the means storing the process execution sequence and names or numbers identifying system data, it is possible to control access by plural processes to the same ID.

When the user is aware of the system data IDs in the fifth or sixth embodiments of the invention, the control operation of the sixth embodiment above is not necessarily required; it is required, however, when it is undesirable to show the system IDs to the user. For example, when a process using system data is added to the sequence, it is necessary to automatically obtain the ID from the system if the system IDs are not to be shown to the user. In this case it is necessary to clearly identify what system data is used and is not used. When moving from FIGS. 6H, 6I and 6J to FIGS. 6K, 6L and 6M, it is necessary to reference the ID/execution sequence memory 31 or check the system data used/unused states to identify an available ID, and add this data to the ID/execution sequence memory 31.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means; an image processing apparatus according to the first embodiment of the invention can conserve memory requirements because parameters can be efficiently stored even when the number of parameters supplied to the processes becomes large. This makes it possible to construct a sufficiently practical image recognition processing logic executable even by low memory capacity image processing apparatuses used for factory automation. There are many different ways of achieving a given objective in the field of image processing, and it is therefore necessary to select the best (most appropriate) method based on the shape of the subject, image contrast, the required precision, and processing speed. As a result, not all of the available methods are used, and only the essential processing components are selected and applied.

The first embodiment of the invention uses these characteristics of the image processing apparatus for factory automation to adaptively select and group the small processing units of the conventional process on the larger 'edge detection' process level. This makes it possible to construct an image recognition process using fewer procedures, and results in an extremely easy-to-use, practical image processing apparatus.

It is also possible by means of the first embodiment of the present invention to easily add new functions and upgrade the software by adding new modes because the parameters applied to the processes can be rewritten to a different format by changing the mode.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; and a means for applying the parameters and mode signal, and executing the process in the sequence specified by the editing means; and being characterized by the measured value memory means comprising a position memory means and a pass/fail memory means; the editing means being able to specify for said position memory and pass/fail memory the name or number of the data of the units required for the process; and the process performer being able to access the measured value memory means by name or number for process input/output; an image processing apparatus according to the second embodiment of the invention reduces the number of name or number settings identifying the inputs and outputs that are the process parameters to approximately one-third the number of the conventional method, and a user-friendly, easy-to-use image processing apparatus can be provided.

The second embodiment of the invention furthermore standardizes the process inputs and outputs to identify the position, pass/fail result, and 'other measured values,' making it easier to link software modules between processes. This format is consonant with the major objectives of image processing apparatuses for factory automation applications, specifically positioning and pass/fail evaluation tasks. As a result, the method of the invention can be applied to many processes, and provides a format whereby processes can be written in an object-oriented manner. In addition, recognition logic systems can be built for an extremely wide range of applications by simply connecting position detection and pass/fail processes, and an apparatus with excellent general purpose applicability can therefore be provided.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a content display on/off setting means for individual process execution; a content display on/off setting means for the complete sequence of executed processes; and being characterized by the process performer being able to display or not display the process contents based on a display on/off signal; an image processing apparatus according to the third embodiment of the invention enables precise display control for the purposes of displaying only the required control items and reducing processing overhead and processing time while also enabling easy batch selection for displaying all process contents, and an easy-to-use image processing apparatus can thus be provided.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means common to all processes for editing and storing the shape and compensation data of the processed area; and a means common to all processes for reading position data from the measured value memory means to set the position of the processed area; an image processing apparatus according to the fourth embodiment of the invention can also easily accomplish position correction of the process area, a common operation. When used in combination with the second embodiment described above, position data can be set by simply specifying the ID, and a user-friendly system with few parameter settings can be achieved.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; and a means for accessing by a unique name or number any separately-stored data required for the process as parameters to be applied to the process; an image processing apparatus according to the fifth embodiment of the invention can batch list and set parameters common to plural processes, share large capacity parameter data between processes, and thereby provide an image processing apparatus that is extremely easy to use. This fifth embodiment of the invention can also be used for batch management of parameters common to plural processes.

By comprising a means for storing measured values; a process performing means for receiving input from and outputting to the measured value memory means; a means for storing the parameters applied to each process in a block hierarchy; a means for storing mode signals indicating the types of parameters for each block; a means for storing the format of the parameters for each process; a means for selecting and editing only those parameters corresponding to the mode based on the parameter format; a means for editing the process execution sequence; a means for applying the parameters and mode signal, and executing the process in the sequence specified by the editing means; a means for storing data separately from the means for storing the parameters applied to each process; a means for accessing by a unique name or number any separately-stored data required for the process as parameters to be applied to the process; a means for storing the process execution sequence and the number or name specifying data stored separately to the means for storing the parameters applied to each process; and a means for managing the data stored separately to the means for storing the parameters applied to each process by the process execution sequence and data number/name information memory means; an image processing apparatus according to the sixth embodiment of the invention can easily control access when plural processes use the same parameter common to those processes. This is particularly effective for automatic ID setting and control when it is not desirable to show the system IDs to the user.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image processing apparatus for effecting a series of processes, each process being selected from different modes of processes, said apparatus comprising:

means for selecting a mode of process for each of said series of processes;

parameter number table means for storing a number representing the amount of parameters necessary for each mode in each of said series of processes;

means for setting a parameter value for each of said parameters of said selected modes of processes;

parameter memory means for sequentially storing said set parameter values;

mode memory means for storing mode data indicative of the selected modes for said series of processes;

parameter allocator means for allocating and producing proper parameter values to corresponding modes of processes with reference to said parameter number table means, as said parameter values and the mode data are read from said parameter memory means and said mode memory means, respectively; and process executing means for effecting said series of processes using said parameter values produced from said parameter allocator means.

2. An image processing apparatus according to claim 1, further comprising a measured data memory means for storing measured data obtained from said process executing means.

3. An image processing apparatus according to claim 2, wherein said measured data comprises a geographical data indicative of a an image position and a quality data indicative of a quality of the measured geographical data.

4. An image processing apparatus according to claim 3, wherein said measured data memory means comprises position memory means for storing measured geographical data and pass/fail memory means for storing quality data, said position memory means and said pass/fail memory means for respective processes being interlinked with a common identifier.

5. An image processing apparatus according to claim 1, further comprising:

display data selecting means for selecting data related to the display of individual processes;

display mode setting means for setting one of three modes of an all-on mode in which data of all processes are displayed, an all-off mode in which data of all processes are not displayed, and a selected data display mode in which data selected by said display setting means are displayed; and display control means for controlling the display based on the mode set by said display mode setting means.

6. An image processing apparatus according to claim 1, further comprising:

means for editing and storing a shape and compensation data of a processed area which is common to a number of processes; and means for reading position data from the measured data memory means to set a position of the processed area which is common to a number of processes.

7. An image processing apparatus according to claim 1, further comprising:

memory means for storing system data, separately from said parameter memory means;

means for managing said system data by adding a system data identifier to said system data; and means for accessing by said system data identifier a system data, and in turn accessing corresponding parameters by said system data.

8. An image processing apparatus according to claim 7, further comprising:

memory means for storing the process execution sequence and said system data identifier; and means for managing the data stored in said memory means for storing the process execution sequence and said system data identifier.

9. An image processing apparatus for effecting a series of processes, each process being selected from different modes of processes, said apparatus comprising:

a mode setting device for selecting a mode of process for each of the series of processes;

a process parameter memory for storing a number representing the amount of parameters necessary for each mode in each of the series of processes;

a mode parameter setting device for setting a parameter value for each of the parameters of the selected mode of process;

a parameter memory for sequentially storing the set parameter values;

a mode memory for storing mode data indicative of the selected mode for the series of processes;

a process parameter allocator for allocating and producing proper parameter values to corresponding modes of processes with reference to said process parameter memory, as the parameter values are read from said parameter memory and the mode data is read from said mode memory; and a process executor for effecting the series of processes using the parameter values produced from said process parameter allocator.

* * * * *